3,078,296
NITROALKYL GLYCOL MONOBORATE ESTERS
Irving S. Bengelsdorf, Costa Mesa, Calif., assignor to United States Borax & Chemical Corporation, Los Angeles, Calif., a corporation of Nevada
No Drawing. Filed Jan. 12, 1962, Ser. No. 165,955
10 Claims. (Cl. 260—462)

The present invention relates as indicated to nitroalkyl glycol monoborate esters and has further reference to means for preparing the same.

It is, therefore, the principal object of this invention to provide as new compositions of matter nitroalkyl glycol monoborate esters.

It is a further object of the present invention to provide efficient and economically desirable means for preparing the nitroalkyl glycol monoborate esters.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the nitroalkyl glycol monoborate esters having the formula

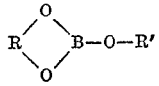

where R is an alkylene radical of from 2 to 4 carbon atoms in length and containing a total of from 2 to 20 carbon atoms, and R' is a radical selected from the group consisting of 2-nitro-n-butyl and 2-nitro-2-methyl-n-propyl.

The nitroalkyl glycol monoborate esters of the present invention have numerous industrial applications. These compounds are excellent bacteriostatic agents which act to inhibit the bacterial degradation of petroleum and petroleum fractions while they are held in storage. They are also useful in antigumming agents for lubricating oils, as fuel additives which increase the efficiency of internal combustion engines, and as corrosion inhibitors in hydraulic and cooling systems.

There are several methods available for preparing the present nitroalkyl glycol monoborate esters. They can be prepared by treating an appropriate glycol with an applicable nitroalcohol and boric acid or boron trioxide. In the preferred embodiment of the invention, however, I prepare these compounds by the esterification of a glycol monoborate with an applicable nitroalcohol. This method can best be illustrated by the following equation:

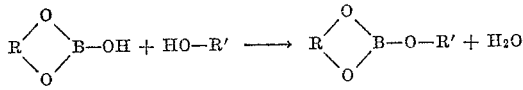

where R and R' are as defined in the foregoing broadly stated paragraph. This reaction will proceed when there is an excess of either reactant. Such excess, however, complicates the separation of the desired product from the reaction mass, and for the sake of economy and ease of separation, in the preferred embodiment of the invention, I use stoichiometric amounts of the reactants.

The preferred method for performing the above reaction is a direct single-step process which involves admixing a glycol monoborate and a nitroalcohol in the presence of a hydrocarbon solvent, such as benzene, toluene, xylene, n-heptane, etc., which will form an azeotrope with the water of reaction. The admixture is then heated under reflux for several hours to complete the reaction, and the water-hydrocarbon solvent azeotrope is removed by distillation. Any excess solvent present is then removed from the remaining reaction mass by distillation and the desired nitroalkyl glycol monoborate ester is recovered as the residue.

The nitroalcohols applicable to the present invention are 2-nitro-n-butanol and 2-nitro-2-methyl-n-propanol, both of which are commercially available compounds.

The glycol monoborates applicable to the present invention have the formula

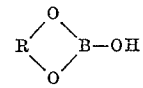

where R is an alkylene radical of from 2 to 4 carbon atoms in length and containing a total of from 2 to 20 carbon atoms. The following list is illustrative of these compounds:

1,2-butanediol monoborate
2-methyl-2-propyl-1,3-propanediol monoborate
1,3-butanediol monoborate
1,3-propanediol monoborate
1,4-butanediol monoborate
2-methyl-2,4-pentanediol monoborate
1,2-ethanediol monoborate
2,2-dimethyl-1,3-butanediol monoborate
2-ethyl-1,3-hexanediol monoborate
2-methyl-2-ethyl-1,3-propanediol monoborate It is to be clearly understood that the foregoing list is only a partial enumeration of the glycol monoborates applicable to the present invention and is in no way intended to limit the invention.

So that the present invention can be more clearly understood, the following examples are given for illustrative purposes:

I

A mixture of 94.2 grams (0.792 mole) of 2-nitro-n-butanol, 114 grams (0.792 mole) of 2-methyl-2,4-pentanediol monoborate and 200 ml. of toluene was placed in a 500 ml. round-bottomed flask. The flask was equipped with a reflux condenser, a Dean-Stark trap and a magnetic stirrer. The reaction mixture was heated for about 5 to 6 hours under reflux at which time the theoretical amount of water, 14.3 ml., had been removed. The excess toluene was then removed by distillation and 197.6 grams (101% yield) of 2-($\beta$-nitro-n-butoxy)-4,4,6-trimethyl-1,3,2-dioxaborinane, a colorless liquid, was recovered. Chemical analysis of the product yielded the following data:

Calculated for $C_{10}H_{20}BNO_5$:
B=4.42%    N=5.72%
C=48.93%   Mol. Wt.=245
H=8.18%

Found in product:
B=4.48%    N=5.85%
C=48.81%   Mol. Wt.=250
H=8.37%

II

A mixture of 119.1 grams (1.0 mole) of 2-nitro-n-butanol, 116 grams (1.0 mole) of 1.3-butanediol monoborate and 300 ml. of benzene was placed in a 1 liter round-bottomed flask. The flask was equipped with a reflux condenser, a Dean-Stark trap and a magnetic stirrer. The reaction mixture was heated for about 4 hours under reflux at which time the theoretical amount of water, 18 ml., had been removed. The excess benzene was then removed by distillation and 213.4 grams (98.3% yield) of 2-(β-nitro-n-butoxy)-4-methyl-1,3,2-dioxaborinane, a colorless liquid, was recovered. Chemical analysis of the product yielded the following data:

Calculated for C₈H₁₆BNO₅:
B=4.99%           N=6.46%
C=44.27%          Mol. Wt.=217
H=7.43%

Found in product:
B=4.92%           N=6.57%
C=44.41%          Mol. Wt.=225
H=7.56%

III

A mixture of 119.1 grams (1.0 mole) of 2-nitro-2-methyl-n-propanol, 144 grams (1.0 mole) of 2-methyl-2,4-pentanediol monoborate and 300 ml., of xylene was placed in a 1 liter round-bottomed flask. The flask was equipped with a reflux condenser, a Dean-Stark trap, and a magnetic stirrer. The reaction mixture was heated for about 5.5 hours under reflux at which time the theoretical amount, 18 ml., of water had been removed. The excess xylene was then removed by distillation and 240 grams (97.9% yield) of 2-(β-nitro-β-methyl-n-propoxy)-4,4,6-trimethyl-1,3,2-dioxaborinane, a colorless liquid was recovered. Chemical analysis of the product yielded the following data:

Calculated for C₁₀H₂₀BNO₅:
B=4.42%           N=5.72%
C=48.93%          Mol. Wt.=245
H=8.18%

Found in product:
B=4.37%           N=5.64%
C=48.99%          Mol. Wt.=256
H=8.12%

IV

A mixture of 119.1 grams (1.0 mole) of 2-nitro-2-methyl-n-propanol, 158 grams (1.0 mole) of 2-methyl-2-propyl-1,3-propanediol monoborate and 250 ml. of toluene was placed in a 1 liter round-bottomed flask. The flask was equipped with a reflux condenser, a Dean-Stark trap, and a magnetic stirrer. The reaction mixture was heated for about 6 hours under reflux at which time the theoretical amount of water, 18 ml., had been removed. The excess toluene was then removed by distillation and 257.3 grams (99.3% yield) of 2(β-nitro-β-methyl-n-propoxy)-5-methyl-5-propyl-1,3,2-dioxaborinane, a colorless low-melting solid was recovered. Chemical analysis of the product yielded the following data:

Calculated for C₁₁H₂₂BNO₅:
B=4.18%           N=5.41%
C=50.99%          Mol. Wt.=259
H=8.56%

Found in product:
B=4.16%           N=5.37%
C=51.14%          Mol. Wt.=265
H=8.59%

Other modes of applying the principle of the invention may be employed, change being made as regards the details described, provided the features stated in any of the following claims or the equivalent of such be employed.

I, therefore, particularly point out and distinctly claim as my invention:

1. Nitroalkyl glycol monoborate esters having the the formula

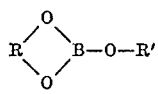

where R is an alkylene radical of from 2 to 4 carbon atoms in length and containing a total of from 2 to 20 carbon atoms, and R' is a radical selected from the group consisting of 2-nitro-n-butyl and 2-nitro-2-methyl-n-propyl.

2. Nitroalkyl glycol monoborate esters having the formula

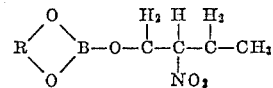

where R is an alkylene radical of from 2 to 4 carbon atoms in length and containing a total of from 2 to 20 carbon atoms.

3. Nitroalkyl glycol monoborate esters having the formula

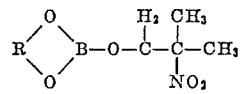

where R is an alkylene radical of from 2 to 4 carbon atoms in length and containing a total of from 2 to 20 carbon atoms.

4. 2(β-nitro-n-butoxy)-4,4,6-trimethyl-1,3,2-dioxaborinane.

5. 2(β-nitro-β-methyl-n-propoxy)-4,4,6-trimethyl-1,3,2-dioxaborinane.

6. 2(β-nitro-n-butoxy)-4-methyl-1,3,2-dioxaborinane.

7. 2(β-nitro-β-methyl-n-propoxy)-5-methyl-5-propyl-1,3,2-dioxaborinane.

8. The method for preparing nitroalkyl glycol monoborate esters having the formula

where R is an alkylene radial of from 2 to 4 carbon atoms in length and containing a total of from 2 to 20 carbon atoms, and R' is a radical selected from the group consisting of 2-nitro-n-butyl and 2-nitro-2-methyl-n-propyl, which comprises admixing glycol monoborate with a material selected from the group consisting of 2-nitro-n-butanol and 2-nitro-2-methyl-n-propanol, heating said admixture under reflux in the presence of a hydrocarbon solvent inert to the reactants, removing the water of reaction as an azeotrope with said hydrocarbon solvent by distillation, distilling off the remaining hydrocarbon solvent and recovering said nitroalkyl glycol monoborate ester.

9. The method for preparing nitroalkyl glycol monoborate esters having the formula

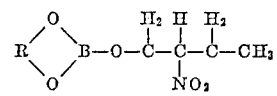

where R is an alkylene radical of from 2 to 4 carbon atoms in length and containing a total of from 2 to 20 carbon atoms, which comprises admixing a glycol monoborate with 2-nitro-n-butanol in about a 1:1 molar ratio, heating said admixture under a reflux in the presence of a hydrocarbon solvent inert to the reactants, removing the water of reaction as an azeotrope with said hydrocarbon solvent by distillation, distilling off the remaining hydrocarbon solvent and recovering said nitroalkyl glycol monoborate ester.

10. The method for preparing nitroalkyl glycol monoborate esters having the formula

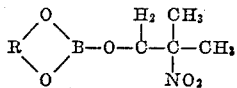

where R is an alkylene radical of from 2 to 4 carbon atoms in length and containing a total of from 2 to 20 carbon atoms, which comprises admixing a glycol monoborate with 2-nitro-2-methyl-n-propanol in about a 1:1 molar ratio, heating said admixture under reflux in the presence of a hydrocarbon solvent inert to the reactants, removing the water of reaction as an azeotrope with said hydrocarbon solvent by distillation, distilling off the remaining hydrocarbon solvent and recovering said nitroalkyl glycol monoborate ester.

No references cited.